US012572797B2

(12) United States Patent
Oh et al.

(10) Patent No.: US 12,572,797 B2
(45) Date of Patent: Mar. 10, 2026

(54) ELECTRONIC APPARATUS IMPLEMENTING ARTIFICIAL INTELLIGENCE MODEL HAVING LOW RESOURCE UTILIZATION AND CONTROL METHOD THEREOF

(71) Applicant: Samsung Electronics Co., Ltd., Suwon-si (KR)

(72) Inventors: Jihun Oh, Suwon-si (KR); Sangjeong Lee, Suwon-si (KR); Meejeong Park, Suwon-si (KR); Gaurav Pooniwala, Suwon-si (KR); Kiseok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1150 days.

(21) Appl. No.: 17/171,290

(22) Filed: Feb. 9, 2021

(65) Prior Publication Data

US 2021/0365779 A1 Nov. 25, 2021

Related U.S. Application Data

(60) Provisional application No. 63/026,960, filed on May 19, 2020.

(30) Foreign Application Priority Data

Sep. 21, 2020 (KR) ........................ 10-2020-0121231

(51) Int. Cl.
G06N 3/08 (2023.01)
G06N 3/04 (2023.01)
G06N 3/063 (2023.01)

(52) U.S. Cl.
CPC ................. *G06N 3/08* (2013.01); *G06N 3/04* (2013.01); *G06N 3/063* (2013.01)

(58) Field of Classification Search
CPC ............ G06N 3/04; G06N 3/063; G06N 3/08; G06N 3/045
See application file for complete search history.

(56) References Cited

U.S. PATENT DOCUMENTS 5,831,880 A * 11/1998 Lee ........................ H03H 17/02
708/319
8,768,989 B2 * 7/2014 Yeung .................... G06F 5/015
708/209

(Continued)

FOREIGN PATENT DOCUMENTS

KR 10-2019-0028242 A 3/2019

OTHER PUBLICATIONS

Markus Nagel, "Data-Free Quantization Through Weight Equalization and Bias Correction", 2019, Qualcomm AI Research † Qualcomm Technologies Netherlands B.V. (Year: 2019).*

(Continued)

*Primary Examiner* — Viker A Lamardo
*Assistant Examiner* — Ababacar Seck
(74) *Attorney, Agent, or Firm* — Jefferson IP Law, LLP

(57) ABSTRACT

An electronic apparatus is provided. The electronic apparatus includes a memory configured to store an artificial intelligence (AI) model including a plurality of layers and a processor, and the AI model may include a plurality of weight values that are scaled based on shift scaling factors different by a plurality of channels included in each of the plurality of layers and quantized by the plurality of layers, and the processor may, based on receiving input data, in a neural network computation process for the input data, compute a channel-wise computation result with an inverse-scaled composite scale parameter based on a shift scaling factor corresponding to each channel.

18 Claims, 13 Drawing Sheets

(56) References Cited

U.S. PATENT DOCUMENTS

| | | | | |
|---|---|---|---|---|
| 9,224,089 | B2 * | 12/2015 | Majumdar | G06N 3/02 |
| 9,916,531 | B1 | 3/2018 | Zivkovic et al. | |
| 10,325,352 | B1 | 6/2019 | Kim et al. | |
| 10,879,928 | B2 * | 12/2020 | Ahirwar | H04L 25/0224 |
| 2004/0267854 | A1 * | 12/2004 | Haider | G06F 7/556 |
| | | | | 708/512 |
| 2010/0195901 | A1 * | 8/2010 | Andrus | H04N 23/741 |
| | | | | 382/168 |
| 2011/0072293 | A1 * | 3/2011 | Mazzaferri | G06F 1/3203 |
| | | | | 713/340 |
| 2019/0392287 | A1 * | 12/2019 | Ovsiannikov | G06N 3/08 |
| 2020/0005125 | A1 | 1/2020 | Venkataramani et al. | |
| 2020/0074637 | A1 * | 3/2020 | Wong | G06V 10/764 |
| 2020/0097823 | A1 | 3/2020 | Chen et al. | |
| 2020/0125947 | A1 | 4/2020 | Park et al. | |
| 2020/0134324 | A1 | 4/2020 | Zeng et al. | |
| 2020/0143249 | A1 | 5/2020 | Georgiadis | |
| 2020/0285965 | A1 * | 9/2020 | Kim | G06N 3/082 |
| 2020/0302299 | A1 * | 9/2020 | Nagel | G06N 3/063 |
| 2020/0364552 | A1 | 11/2020 | Guo | |
| 2021/0034982 | A1 * | 2/2021 | Sather | G06N 3/082 |
| 2021/0103803 | A1 * | 4/2021 | Mills | G06N 3/045 |
| 2021/0279557 | A1 * | 9/2021 | Febbo | G06N 3/063 |

OTHER PUBLICATIONS

Raghuraman Krishnamoorthi, "Quantizing deep convolutional networks for efficient inference: A whitepaper", Jun. 2018 (Year: 2018).*
Benoit Jacob, "Quantization and Training of Neural Networks for Efficient Integer-Arithmetic-Only Inference", Dec. 2017 (Year: 2017).*
Song Han, "Deep Compression: Compressing Deep Neural Networks With Pruning, Trained Quantization and Huffman Coding", Feb. 2016 (Year: 2016).*
Towards Efficient Compact Network Training on Edge-Devices Xiong et al. (Year: 2019).*
Learning Efficient Convolutional Networks through Network Slimming Liu et al. (Year: 2017).*
IFPNA: A Flexible and Efficient Deep Learning Processor in 28-nm CMOS Using a Domain-Specific Instruction Set and Reconfigurable Fabric Chen et al. (Year: 2019).*
Towards Efficient Compact Network Training on Edge-Devicesl Xiong et al. (Year: 2019).*
A VLSI Efficient Programmable Power-of-Two Scaler for . . . RNS Low et al. (Year: 2012).*
Learning to Quantize Deep Networks by Optimizing Quantization Intervals with Task Loss Jung et al. (Year: 2018).*

Learning Efficient Convolutional Networks through Network Slimming Li et al. (Year: 2017).*
Deep Compression: Compressing Deep Neural Networks With Pruning, Trained Quantization and Huffman Coding Han et al. (Year: 2016).*
DIMA: A Depthwise CNN In-Memory Accelerator Angizi et al. (Year: 2018).*
Quantization for Rapid Deployment of Deep Neural Networks Lee et al. (Year: 2018).*
IFPNA: A Flexible and Efficient Deep Learning Processor in 28-nm CMOS Using a Domain-Specific Instruction Set and Reconfigurable Fabric Lee et al. (Year: 2019).*
Weight Equalizing Shift Scaler-Coupled Post-training Quantization Lee et al. (Year: 2020).*
Model Compression and Acceleration for Deep Neural Networks Cheng et al. (Year: 2018).*
A Survey on Methods and Theories of Quantized Neural Networks Yunhui Guo (Year: 2018).*
Data Free Quantization Through Weight Equalization and Bias Correction, ICCV 2019.
Alternating multi-bit quantization for recurrent neural networks, ICLR 2018.
Quantizing deep convolutional networks for efficient inference: A whiltepaper, Jun. 21, 2018.
ZeroQ A Novel Zero Shot Quantization Framework, CVPR 2020.
Eldad Meller et al., Same, Same But Different—Recovering Neural Network Quantization Error Through Weight Factorization, arXiv:1902.01917v1, Feb. 2019 [retrieved on May 28, 2021]. Retrieved from <https://arxiv.org/abs/1902.01917v1>, sections 1-4.
Ron Banner et al., Post training 4-bit quantization of convolutional networks for rapid-deployment, arXiv:1810.05723v3, May 2019 [retrieved on May 28, 2021]. Retrieved from <https://arxiv.org/abs/1810.05723v3>, sections 1-5.
Ritchie Zhao et al., Improving Neural Network Quantization without Retraining using Outlier Channel Splitting, arXiv:1901.09504v1, Jan. 2019 [retrieved on May 28, 2021]. Retrieved from <https://arxiv.org/abs/1901.09504v1>, sections 3-4.
Jun Haeng Lee et al., Quantization for Rapid Deployment of Deep Neural Networks, arXiv:1810.05488v1, Oct. 2018 [retrieved on May 28, 2021]. Retrieved from <https://arxiv.org/abs/1810.05488v1>, sections 2-3.
Jihun Oh et al., Weight Equalizing Shift Scaler-Coupled Post-training Quantization, arXiv:2008.05767v1, Aug. 2020 [retrieved on May 28, 2021]. Retrieved from <https://arxiv.org/abs/2008.05767v1>, the entire document.
International Search Report dated Jun. 15, 2021, issued in International Application No. PCT/KR2021/002302.

* cited by examiner

FIG. 5A

| Models | MobileNet v1 (%) | MobileNet v2 (%) | ResNet50 v1 (%) | ResNet50 _dt v1 (%) | Inception v3 (%) |
|---|---|---|---|---|---|
| Baseline | 70.60 | 71.87 | 76.48 | 75.21 | 77.97 |
| LWQ | 0.10 | 0.11 | 76.18 | 74.94 | 77.62 |
| CWQ | 69.74 | 70.98 | 76.20 | 75.08 | 77.61 |
| DFQ | 67.52 | 69.12 | – | – | – |
| WES | 69.68 | 69.73 | 76.29 | 75.12 | 77.64 |

FIG. 5B

| | bit1 | bit2 | Channel-wise quantization | Weight Equalizing Scaler (WES) | Layer-wise quantization |
|---|---|---|---|---|---|
| weight | 8 | | 73728 | 73728 | 73728 |
| weight zp | 8 | | 8192 | 8 | 8 |
| input zp | 8 | | 8 | 8 | 8 |
| output zp | 8 | | 8 | 8 | 8 |
| Scale (composite) | 32 | 6 | 38912 | 38 | 38 |
| Bias | 32 | | 32 | 32 | 32 |
| Ch-scale | 4 | | 0 | 4096 | 0 |
| Total(Bit) | | | 120880 | 77918 | 73822 |
| Total(Kbyte) | | | 14.75585935 | 9.511474609 | 9.011474609 |

Depth-wise conv filter size = 3x3x1024x1

ELECTRONIC APPARATUS IMPLEMENTING ARTIFICIAL INTELLIGENCE MODEL HAVING LOW RESOURCE UTILIZATION AND CONTROL METHOD THEREOF

CROSS-REFERENCE TO RELATED APPLICATION(S)

This application is based on and claims priority under 35 U.S.C. § 119(e) of a U.S. provisional application Ser. No. 63/026,960, filed on May 19, 2020, in the U.S. Patent and Trademark Office, and under 35 U.S.C. § 119(a) of a Korean patent application number 10-2020-0121231, filed on Sep. 21, 2020, in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus that processes an artificial intelligence (AI) model that simulates cognition, determination of human brain using a machine learning algorithm, such as deep learning and a control method thereof.

2. Description of Related Art

Quantization is used to increase a compression rate while minimizing the degradation of a performance of the deep learning model. A weight quantization method may be classified into post-training quantization and quantization-aware training based on the point of time of performing quantization, and may be classified into linear quantization and non-linear quantization based on a quantization scheme.

The post-training quantization performs IntN Quantization using a pre-trained Float32 model without re-learning and the quantization speed is fast and learning data is not required. The linear quantization may be easily implemented with INT MULTIPLYER and INT ADDER in hardware and may be widely supported in a neural processing unit (NPU).

Despite this advantage, in general, the combination of post-training quantization and linear quantization has a disadvantage in that the accuracy loss is increased toward a condition of a small quantum bit (8 bits or less) after quantization compared to the combination of quantization-aware and non-linear quantization. This is because a plurality of channels included in one layer have parameter distributions different from each other, and in particular, a channel having a small range of parameter distributions may converge to one quantum value after quantization, resulting in increase in quantum errors.

Various methods are being developed to overcome this disadvantage.

First, unlike a related-art method in which quantization is performed on a neural network layer unit, to obtain a pair of a minimum value and a maximum value by layers and calculate a quantum parameter (QWeight, Scale, Zero point) required for a hardware fixed computing, channel-wise quantization calculates a pair of a minimum value and a maximum value by parameters by proceeding quantization in a channel unit included in a layer. For example, n [min, max] may be obtained for n channels.

The quantization precision loss may be reduced through this operation, but there is a problem of increasing the quantum parameter size in proportion to the number of channels. This increases a time of loading the quantum parameter from a main memory to a cache memory, thereby degrading the latency performance.

Cross layer equalization (CLE) may perform pre-processing to apply $S_i$ (float) scaling, $S_i^{-1}$ (float) rescaling to output of a front convolution layer and input corresponding to a back convolution layer. A scale is continuously adjusted from a first layer to a last layer of the neural network, and the whole part is repeated again until there is no change in the $S_i$, and a general layer-wise quantization is performed when the pre-processing is finished.

Through the pre-processing, a range of the channel-wise parameters is adjusted to overlap so that the quantization precision loss becomes smaller, but due to a property of maintaining scaling equivariance between consecutive neural network layers, a problem may arise for piecewise linear, such as ReLU6 or PReLU between layers. Accordingly, the ReLU6 or PReLU needs to be replaced with ReLU, and there may be problem that an activated feature map distribution may change, an error may increase, and an accuracy may be degraded.

Accordingly, there is a need to develop a method which may be advantageous for hardware computation and may improve the quantization efficiency while maintaining the accuracy of quantization without requiring structural changes in the neural network layer.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that performs a neural network computation by using an artificial intelligence model that is shift-scaled by channels and quantized by layers and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a memory configured to store an artificial intelligence (AI) model including a plurality of layers and a processor, the AI model may include a plurality of weight values that are scaled based on shift scaling factors different by a plurality of channels included in each of the plurality of layers and quantized by the plurality of layers, and the processor is further configured to, based on receiving input data, in a neural network computation process relative to the input data, compute a channel-wise computation result with an inverse-scaled composite scale parameter based on a shift scaling factor corresponding to each channel.

The AI model may include a plurality of quantized weight values, a plurality of channel-wise shift scaling factors included in each of the plurality of layers, scale parameters corresponding to each of the plurality of layers and a zero point parameter corresponding to each of the plurality of layer, the scale parameter may, based on each of the plurality of layers being quantized, represent a slope between a value before quantization and a value after quantization, and the zero point parameter may, based on quantizing each of the plurality of layers, represent a value after quantization of a zero value before quantization.

The processor is further configured to obtain the composite scale parameter by inverse scaling of a value obtained based on a scale parameter of a current layer, a scale parameter of a layer just before the current layer, and a scale parameter of the plurality of weight values based on the shift scaling factors corresponding to the respective channel.

The processor is further configured to obtain the composite scale parameter by shifting the obtained value based on the shift scaling factors corresponding to the respective channel.

The obtained value may be inversely proportional to the scale parameter of the current layer, and may be proportional to the scale parameter of the layer just before the current layer and the scale parameter of the plurality of weight values.

The processor may, based on identifying that the plurality of channel-wise shift scaling factors are included in the AI model, perform the inverse scaling.

The electronic apparatus may be implemented as a neural processing unit (NPU).

The shift scaling factors corresponding to the respective channel may be determined based on a weight value included in the respective channel and a weight value included in a layer including the respective channel.

The shift scaling factor corresponding to the respective channel may be decided based on a weight value having greatest size in the respective channel and a weight value having greatest size in a layer including the respective channel.

In accordance with another aspect of the disclosure, a control method of an electronic apparatus is provided. The control method includes receiving input data and by using an artificial intelligence model, in a neural network computation process relative to the input data, computing a channel-wise computation result of each of a plurality of layers forming the AI model with an inverse-scaled composite scale parameter based on a shift scaling factor corresponding to each channel, and the AI model may include a plurality of weight values that are scaled based on shift scaling factors different by a plurality of channels included in each of the plurality of layers and quantized by the plurality of layers.

The AI model may include a plurality of quantized weight values, a plurality of channel-wise scaling factors included in each of the plurality of layers, scale parameters corresponding to each of the plurality of layers and a zero point parameter corresponding to each of the plurality of layers, the scale parameter may, based on each of the plurality of layers being quantized, represent a slope between a value before quantization and a value after quantization, and the zero point parameter may, based on quantizing each of the plurality of layers, represent a value after quantization of a zero value before quantization.

The computing may include obtaining the composite scale parameter by inverse scaling of a value obtained based on a scale parameter of a current layer, a scale parameter of a layer just before the current layer, and a scale parameter of the plurality of weight values based on the shift scaling factors corresponding to the respective channel.

The computing may include obtaining the composite scale parameter by shifting the obtained value based on the shift scaling factors corresponding to the respective channel.

The obtained value may be inversely proportional to the scale parameter of the current layer, and may be proportional to the scale parameter of the layer just before the current layer and the scale parameter of the plurality of weight values.

The computing may include, based on identifying that the plurality of channel-wise shift scaling factors are included in the AI model, performing the computing.

The electronic apparatus may be implemented as a neural processing unit (NPU).

The shift scaling factors corresponding to the respective channel may be determined based on a weight value included in the respective channel and a weight value included in a layer including the respective channel.

The shift scaling factor corresponding to the respective channel may be determined based on a weight value having greatest size in the respective channel and a weight value having greatest size in a layer including the respective channel.

According to various embodiments of the disclosure, the electronic apparatus may improve the accuracy of a neural network computation while using an artificial intelligence model implemented in a relatively small capacity by computing the channel-wise computation result with inverse-scaled composite scale parameter based on the shift scaling factors corresponding to each channel in a neural network computation process relative to input data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and/or other aspects, features, and advantages of certain embodiments of the disclosure will be more apparent from the following description taken in conjunction with the accompanying drawings, in which:

FIG. 5A is a diagram illustrating an effect according to an embodiment of the disclosure;

FIG. 5B is a diagram illustrating an effect according to an embodiment of the disclosure;

The same reference numerals are used to represent the same elements throughout the drawings.

DETAILED DESCRIPTION

Figure 1A:
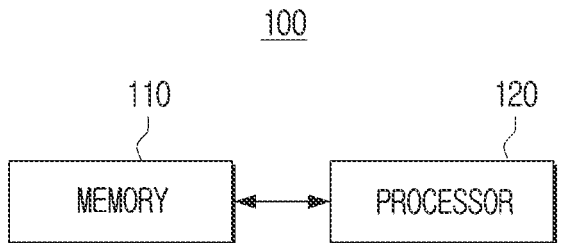
FIG. 1A is a block diagram illustrating a configuration of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the present specification and the claims are general terms identified based on the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description Therefore, the terms used in embodiments of the disclosure should be defined based on the meaning of the terms and the contents throughout the disclosure rather than simple names of the terms.

In this specification, the expressions "have," "may have," "include," or "may include" or the like represent presence of a corresponding feature (for example: components, such as numbers, functions, operations, or parts) and does not exclude the presence of additional feature.

The expression "At least one of A or/and B" should be understood to represent "A" or "B" or any one of "A and B."

As used herein, the terms "first," "second," or the like may denote various components, regardless of order and/or importance, and may be used to distinguish one component from another, and does not limit the components.

A singular expression includes a plural expression, unless otherwise specified. It is to be understood that the terms, such as "comprise" or "consist of" are used herein to designate a presence of a characteristic, number, operation, element, component, or a combination thereof, and not to preclude a presence or a possibility of adding one or more of other characteristics, numbers, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, embodiments of the disclosure will be described below with reference to the accompanying drawings.

FIG. 1A is a block diagram illustrating a configuration of an electronic apparatus according to an embodiment of the disclosure.

Referring to FIG. 1A, an electronic apparatus 100 includes a memory 110 and a processor 120 as illustrated in FIG. 1A.

The electronic apparatus 100 may be a device for performing a neural network operation based on an artificial intelligence (AI) model. For example, when the electronic apparatus 100 may store an AI model, and when the input data is received, the electronic apparatus 100 may perform a neural network computation on the input data based on the AI model, and may be implemented as a desktop personal computer (PC), a notebook computer, a television (TV), or the like. However, the embodiment is not limited thereto and the electronic apparatus 100 may be any device capable of performing a neural network computation based on the AI model.

The electronic apparatus 100 may be a device of which a resource is limited, such as a smartphone, a tablet PC, a wearable device, or the like, and may be a device that stores the quantized AI model, and performs a neural network computation based on the quantized artificial intelligence model. The quantization means that a consecutive value is divided into a plurality of levels, and a value in each level is substituted with a value representing each level.

For example, the data size may be reduced through quantization, which substitutes the value between 0 and 1 to 1, and substitutes a value between 1 and 2 to 2. For example, the neural network computation may be performed in the form of an on-device in the resource-limited electronic apparatus 100 by quantization of the AI model. A specific description of the quantization of an AI model will be described later.

The memory 110 may refer to a hardware that stores information, such as data as an electric or magnetic form so that the processor 120, or the like, may access, and the memory 110 may be implemented as at least one hardware among a non-volatile memory, a volatile memory, a flash memory, a hard disk drive (HDD) or solid state drive (SSD), random access memory (RAM), read-only memory (ROM), or the like.

The memory 110 may store at least one instruction, program, or data used for operation of the electronic apparatus 100 or the processor 120. The instruction is a code unit that directs the operation of the electronic apparatus 100 or the processor 120, and may be written in a machine language that may be understood by a computer. A module may be an instruction set of a series of instructions that perform a particular task of a task unit.

The memory 110 may store data which is information in a unit of a bit or byte that may represent characters, numbers, images, or the like. For example, data, such as documents including a plurality of sentences may be stored in the memory 110.

An AI model including a plurality of layers may be stored in the memory 110. The AI model may include a plurality of weight values that are scaled based on different shift scaling factors for each of a plurality of channels included in each of the plurality of layers and quantized for each of the plurality of layers.

For example, if it is assumed that the AI model before scaling and quantization consists of five layers, and each of the five layers includes 32 channels, the AI model before scaling and quantization may include a total of 160 channels. First, each of the 160 channels may be scaled based on a different shift scaling factors.

Figure 1B:
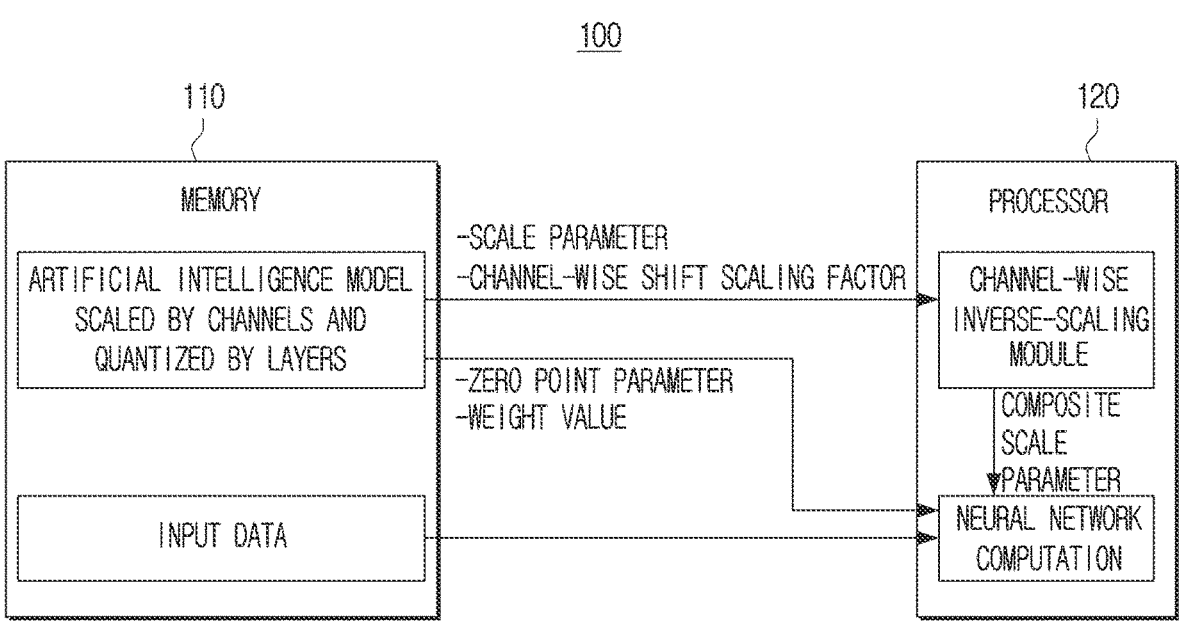
FIG. 1B is a block diagram illustrating a configuration of a software of an electronic apparatus according to an embodiment of the disclosure.
Figure 1C:
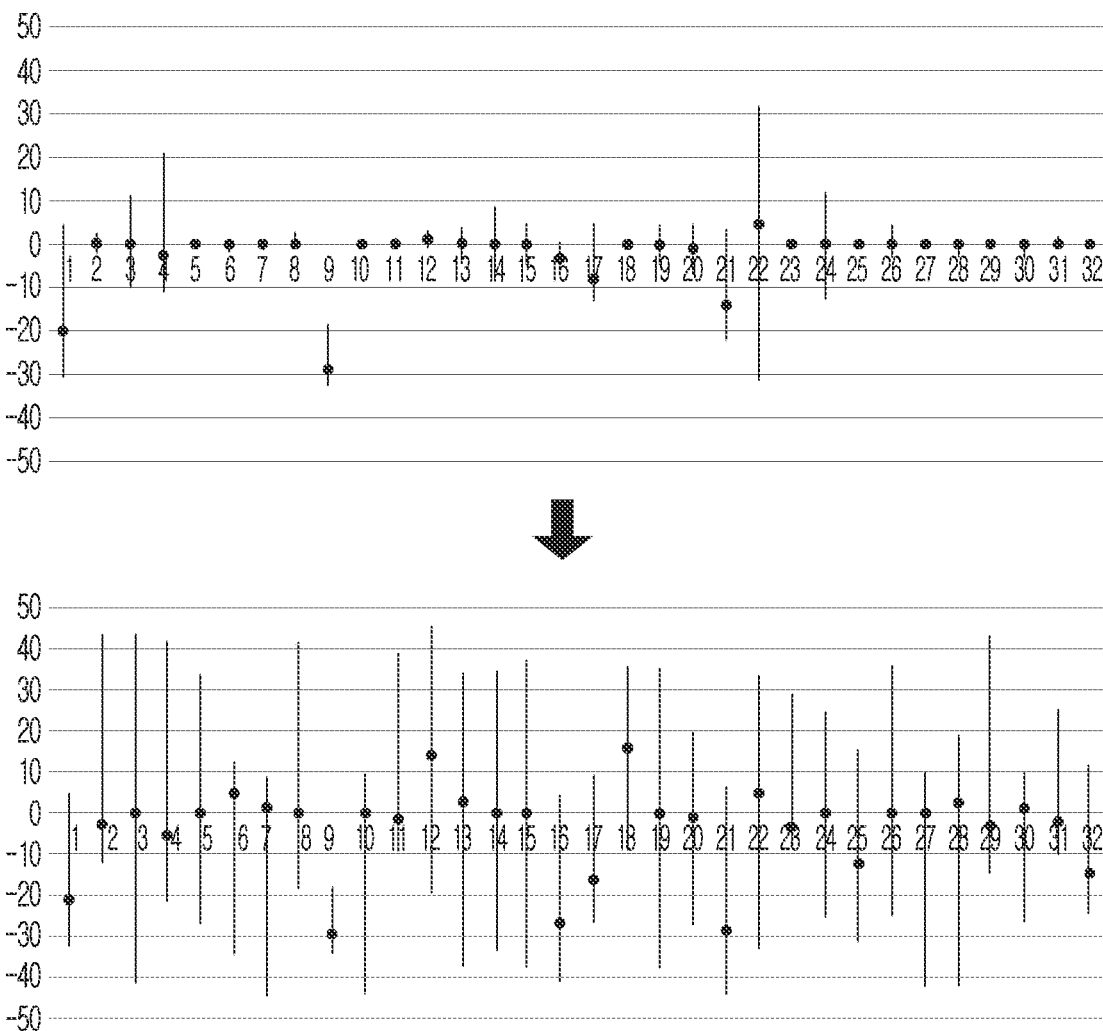
FIG. 1C is a diagram illustrating channel-wise scaling according to an embodiment of the disclosure.

FIG. 1C is a diagram illustrating channel-wise scaling according to an embodiment of the disclosure.

Referring to FIG. 1C, an upper drawing of FIG. 1C illustrates a plurality of channels included in one of the five layers included in an AI model. A lower drawing of FIG. 1C is a view illustrating that each of the plurality of channels is scaled through different shift scaling factors.

In this manner, the shift scaling factor may be different for each channel, and the entire shift scaling factor may be a total of 160. Here, the channel-wise shift scaling factor may be determined in a form of a power-of-two format so as to be performed by a shift computation in hardware. For example, a first channel may be scaled based on shift by 3, and a second channel may be scaled based on shift by 5. The shift scaling factor applied to each channel may be determined based on a largest weight value in each channel and a largest weight value in a layer in which each channel is included. For example, if the weight value having the largest size in the first layer of the five layers is 10, and the weight value having the largest size in the first channel included in the first layer is 6, an initial value of the shift scaling factor of the first channel included in the first layer may be determined based on a 2-exponential logarithmic ratio between 10 and 6. In addition, the optimal value of the channel-wise shift scaling factor may be obtained by defining a quantum-inverse quantization error value or a Top-1 test accuracy as a cost function, and through a nonlinear optimization method (Nelder-Mead, Bayesian Optimization, or the like). As described above, channels with relatively small deviations may have a relatively large shift scaling factor, and channels with relatively large deviations may have relatively small shift scaling factors, and even if quantization is performed in a layer-wise manner through this operation, accuracy of a certain level may be secured.

When the scaling is completed, quantization is performed for each layer. For example, if the minimum and maximum values of the weight values of the first layer are mapped to 0 and 255, respectively, the weight value of the first layer may be substituted with an integer between 0 and 255.

As described above, the AI model shift-scaled by channels and quantized by layers may include a plurality of quantized weight values, a plurality of channel-wise shift scaling factors included in each of the plurality of layers, and a scale parameter and a zero point parameter corresponding to each of the plurality of layers. Here, when quantizing each of the plurality of layers, the scale parameter may represent a slope between a value before quantization and a value after quantization, and the zero point parameter may represent a value after quantization of a zero value before quantization when quantizing each of the plurality of layers.

This requires additional data as much as the channel-wise shift scaling factor than when performing layer-wise quantization without related-art channel-wise scaling, but when performing quantization without related-art scaling, there is a problem that the accuracy of some channels is lowered in accordance with quantization, and according to the disclosure, there is an advantage of addressing this issue through channel-wise shift scaling. Alternatively, while the accuracy is secured when performing related-art channel-wise quantization, there is a problem that significant data is required, as quantization parameters (a scale in a form of 38-bit floating point and a zero point in a form of 8-bit integers) are required for each channel, but according to the disclosure, there is an advantage that added data is merely a channel-wise shift scaling factor in a form of 4-bit integer while securing a certain level of accuracy through channel-wise shift scaling.

In other words, the AI model quantized for each layer after the channel-wise shift scaling requires additional storage capacity as much as the channel-wise shift scaling factor than a case of performing layer-wise quantization without scaling in the related art, but the additional storage capacity is not a significant level compared to capacity of the weight and this may not be a serious problem in performing a neural network operation in an on-device format. Nevertheless, using an AI model quantized for each layer after channel-wise scaling, a predetermined level of accuracy may be secured, and this will be described along with the operation of the processor 120.

The processor 120 may control overall operations of the electronic apparatus 100. The processor 120 may be connected to each configuration of the electronic apparatus 100 to control overall operations of the electronic apparatus 100. For example, the processor 120 may be connected to a memory 110, a communication interface (not shown), or the like, for controlling the operation of the electronic apparatus 100.

The processor 120 according to an embodiment may be implemented with a digital signal processor (DSP), a microprocessor, and a time controller (TCON), or the like, but the processor is not limited thereto. The processor 120 may include, for example, and without limitation, one or more among a central processor (CPU), a micro controller unit (MCU), a microprocessor unit (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type which a processing algorithm is built therein, application specific integrated circuit (ASIC), or in a field programmable gate array (FPGA) type.

When the input data is received, the processor 120 may compute a computation result of each channel with an inverse-scaled composite scale parameter based on a shift scaling factor corresponding to each channel in a neural network operation process for the input data. As described above, the operation is to restore the scale of different outputs to an original scale, according to the channel-wise shift scaling to reduce the quantum error.

The operation of the processor 120 will be described below through various modules of FIG. 1B.

FIG. 1B is a block diagram illustrating a configuration of a software of an electronic apparatus according to an embodiment of the disclosure.

Referring to FIG. 1B, a plurality of modules being located within the processor 120 is to represent a state in which a plurality of modules are loaded (or executed) by the processor 120 and operated by the processor 120, and the plurality of modules may be pre-stored in the memory 110.

Referring to FIG. 1B, the memory 110 may store an artificial intelligence model that is shift-scaled for each channel and quantized for each layer, and input data. Here, the artificial intelligence model may include a scale parameter and a zero point parameter.

The processor 120 may control the overall operation of the electronic apparatus 100 by executing a module or instruction stored in the memory 110. The processor 120 may read and interpret modules or instructions and may decide a sequence for data processing, and may transmit a control signal for controlling operations of other configurations, such as the memory 110 to control the operation of other configurations.

The processor 120 may apply the input data to the quantized artificial intelligence model by executing the neural network computation module and the channel-wise inverse scaling module. The processor 120 may perform a neural network computation on the input data, and may obtain a composite scale parameter for inverse scaling of the channel-wise computation results. Here, the neural network computation module and the channel-wise inverse scaling module may be physically implemented in one module or may be implemented in a divided form.

For example, the processor 120 may compute the input data or the feature map data with a weight value of a corresponding channel and then may compute the computation result with the inverse scaled composite scale parameter based on the corresponding shift scaling factor. The processor 120 may compute the input data with a weight value of each of the plurality of first channels included in the first layer, and may compute an operation result with the weight value of each of the plurality of first channels with the inverse-scaled composite scale parameter based on a shift scaling factor corresponding to each of the plurality of first channels. The processor 120 may compute the feature map data output from the first layer with a weight value of each of a plurality of second channels included in a second layer subsequent to the first layer, and may compute the computation result with the weight value of each of the plurality of second channels with an inverse-scaled composite scale parameter based on a shift scaling factor corresponding to each of the plurality of second channels. The inverse scaling operation of the processor 120 may be implemented as a shift operation, and the shift operation and the composite scale parameter will be described below.

The weight value included in the AI model is a value obtained through shift scaling based on different shift scaling factors by channels included in the AI model and quantized by layers. A structure of data of the AI model will be described to describe the foregoing.

The AI model may include a zero point parameter and a scale parameter corresponding to each of the plurality of layers. The scale parameter may represent a slope between a value before quantization and a value after quantization when quantizing each of the plurality of layers, and the zero point parameter may represent a value after quantization of a zero value before quantization when quantizing each of the plurality of layers.

For example, when quantization is performed in a manner in which the minimum value and the maximum value of the weight values of the first layer are mapped to 0 and 255, respectively, a quantized weight value, a zero point parameter, and a scale parameter representing a correlation between a minimum value and a maximum value and 0 and 255 may be obtained. The scale parameter may represent a slope representing a correlation between the data before and after the quantization, and the zero point parameter may represent a degree that the correlation is out of origin or a quantum value representing a real number of 0.0.

Through the method as described above, a scale parameter and a zero point parameter for a layer-wise weight value may be obtained. In addition, scale parameters and zero point parameters for input and output of each layer may be obtained in the same manner. The processor 120 may perform inverse scaling the value obtained based on the scale parameter of the current layer, the scale parameter of a previous layer just before the current layer, and the scale parameter of the plurality of weight values based on a shift scaling factor corresponding to each channel to obtain the composite scale parameter.

For example, the processor 120 may obtain the output value quantized to Equation 1 below. The process of obtaining Equation 1 will be described with reference to drawing.

$$q_{out}^i = z_{out} + \frac{S_{in}S_w}{S_{out}}\left\{\left(\sum_j \sum_{w_h w_w}(q_w^{ij} - z_w)(q_{in}^j - z_{in})\right) + q_B^i\right\} \qquad \text{Equation 1}$$

Here, $(q_{in}, s_{in}, z_{in})$ is feature map data (or input data), a scale parameter of a previous layer, and a zero point parameter of a previous layer, as the output data of the previous layers, $(q_w, s_w, z_w)$ is quantized weight value, scale parameter of the weight value, zero point parameter of the weight value, and $(q_{out}, s_{out}, z_{out})$ is output data of the current layer, scale parameter of the current layer, and the zero point parameter of the current layer. $q_B^i$ may represent a quantum bias value after symmetric quantization of floating bias $B^i$ to $S_{in}S_w$ scale, and I and j are output channel index and input channel index, respectively.

The processor 120 may obtain a weight value, a zero point parameter (a previous layer, a current layer, a weight value), and input data from the memory 110 by executing a neural network computation module, and may obtain a channel-wise shift scaling factor, a scale parameter (a previous layer, a current layer, and a weight value) from the memory 110 by executing a channel-wise inverse scaling module. The channel-wise inverse scaling module may obtain a composite scale parameter by inversely scaling a value obtained based on a scale parameter of a previous layer, a scale parameter of a current layer, and a scale parameter of a weight value, based on a shift scaling factor corresponding to each channel. For example, the process of obtaining the composite scale parameter may include inverse scaling, and the channel-wise inverse scaling module may provide the composite scale parameter to the neural network computation module. The obtained value may be inversely proportional to the scale parameter of the current layer, and may be proportional to the scale parameter of a layer just before the current layer and the scale parameter of the plurality of weight values.

The processor 120 may convert $S_{in}*S_w/S_{out}$ which is the computation value between scale parameters of Equation 1 to a form of $M*2^{-s}$, and may add shift scaling factor (s_i) corresponding to each channel as $M*2^{-s_i}$, to obtain the inverse-scaled composite scale parameter.

The processor 120 may process the data in a binary manner and thus, the addition of the shift scaling factor may be implemented as a shift operation. The processor 120 may obtain a composite scale parameter by shifting the obtained value based on a shift scaling factor corresponding to each channel, and here, a shift operation is merely added, thus facilitating hardware implementation.

The processor 120 may perform a computation, such as Equation 1 by executing a neural network computation module. The processor 120 may perform a neural network computation based on the weight value, a zero point parameter (a previous layer, a current layer, a weight value), input data, and a composite scale parameter. Here, the zero point parameter of the previous layer and the current layer may be a fixed value during the calculation of the current layer, and the zero point parameter of the weight value may be the same until the layer is changed to a value used for quantization of the weight value. In the process of performing the neural network computation, the composite scale parameter obtained through the channel-wise inverse scaling module may be different for each channel.

If it is identified that a plurality of channel-wise shift scaling factors included in each of the plurality of layers are included in the quantized artificial intelligence model by executing the channel-wise inverse scaling module, the processor 120 may perform inverse scaling. For example, the processor 120 may decide whether to perform the inverse scaling operation based on whether the AI model includes a channel-wise shift scaling factor. Specifically, the processor 120 may perform inverse scaling through a shift operation when the AI model includes a channel-wise shift scaling factor, and if the artificial intelligence model does not include a channel-wise shift scaling factor, may not perform a shift operation. When the AI model includes a channel-wise shift scaling factor, the processor 120 may use $M*2^{-s-s\_i}$ for a neural network computation, and if the artificial intelligence model does not include a channel-wise shift scaling factor, the processor 120 may use $M*2^{-s}$ for a neural network computation.

The electronic apparatus 100 may be implemented as a neural processing unit (NPU). In this example, a cache memory, or the like, included in the neural network processing device may operate as the memory 110, and a plurality of processing elements included in the neural processing unit may operate as the processor 120.

As described above, the processor 120 may perform the inverse scaling operation in the neural network calculation process, and may obtain the result of the inverse scaling by only the shift operation of some data and thus, the implementation of the on-device form may be facilitated.

There may be an effect that data of each channel is not crushed according to the scaling of each channel in the quantization process of the artificial intelligence model, thereby securing a predetermined level of accuracy.

Figure 1D:
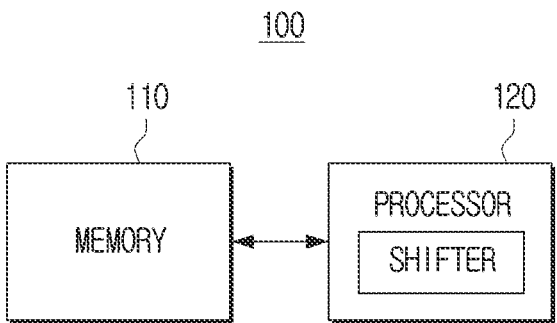
FIG. 1D is a diagram illustrating a method of implementing a shifter according to an embodiment of the disclosure.

FIG. 1D is a diagram illustrating a method of implementing a shifter according to an embodiment of the disclosure.

Referring to FIG. 1D, as described above, the inverse scaling operation may be implemented via a shifter. For example, as shown in FIG. 1D, the shifter may be implemented as one configuration within the processor 120. The inverse scaling module for each channel of FIG. 1B may be implemented as a shifter.

Figure 1E:
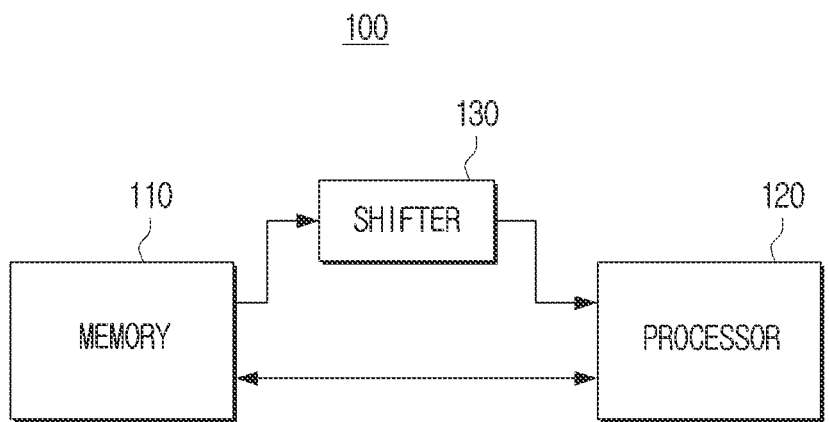
FIG. 1E is a diagram illustrating a method of implementing a shifter according to an embodiment of the disclosure.

FIG. 1E is a diagram illustrating a method of implementing a shifter according to an embodiment of the disclosure.

Referring to FIG. 1E, the shifter 130 may be implemented as an external configuration of the processor 120. In this example, the shifter 130 may receive the scale parameter and the channel-wise shift scaling factor from the memory 110 and perform inverse scaling the obtained value based on the scale parameter of the previous layer, the scale parameter of the current layer, and the scale parameter of the weight value to obtain the composite scale parameter based on the shift scaling factor corresponding to each channel. The shifter 130 may provide the composite scale parameter to the processor 120.

If the shifter is implemented as FIG. 1E, there is an effect that inverse scaling is available even if a related-art processor is used.

Various embodiments will be described below with reference to the drawings.

Figure 2:
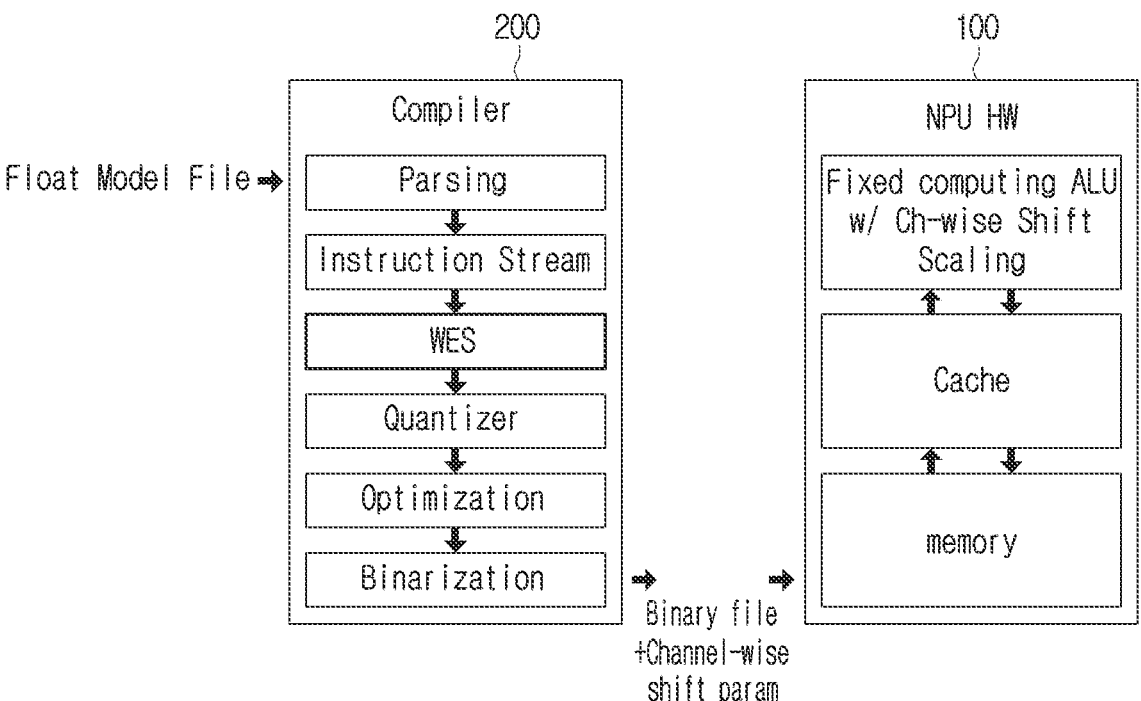
FIG. 2 is a diagram illustrating an operation of a compiler and an electronic apparatus according to an embodiment of the disclosure.

FIG. 2 is a diagram illustrating an operation of a compiler and an electronic apparatus according to an embodiment of the disclosure.

Referring to FIG. 2, a compiler 200 may scale a plurality of weight values included in a float model file based on the different shift scaling factors for each of a plurality of channels included in each of the plurality of layers, and may quantize by a plurality of layers.

The compiler 200 may include a parsing module for parsing an input model, an instruction stream module for reconstructing to an op supported by the custom NPU, a weight equalizing scaler (WES) module, a quantizer module for quantizing the Float parameter into IntN, a memory distribution, an optimization module for optimizing (tiling) the operation, and a binarization module for creating a binary file.

The WES module may receive parameters of the Float32 format and a graph file connected as a chain in a single direction, including an NPU HW operation from the instruction stream module.

As shown in upper portion of FIG. 1C, the WES module may obtain the minimum value and the maximum values of the original parameter for each channel, and may obtain a channel-wise shift scaling factor (a channel-wise shift scale value) by determining a reference range to have a minimum quantization error using the minimum value and the maximum value for each channel.

The WES module may calculate a range of original parameters for each channel, set a range having a maximum value (channel 22 of an upper portion of FIG. 1C) to a reference range, and may obtain a channel-wise shift scaling factor based on the reference range.

For example, the WES module may identify a weight value that has the greatest value among the weight values included in one layer and may obtain a shift scaling factor of each channel based on the identified weight value. The WES module may obtain a shift scaling factor of each channel based on the greatest weight value in each channel and the weight value identified above.

The WES module may shift scale each channel with respect to the total range, and then sum up the ratio of the changed range values so that the summed value increases, by applying a gradient-descent method, thereby obtaining channel-wise shift scaling factor.

The WES module may shift scale each channel and quantize into int and sum quantum errors which may be generated through an inverse quantization process to restore by floating by channels so that the summed value has a minimum value.

The WES module may obtain Si by dividing the reference range into the range of each channel, and then taking the algorithm having exponent 2 and taking its down value. $2^{Si}$ is easy to be processed with Shift (<<Si) computation in hardware that calculates binary numbers and may easily implement hardware.

The updated parameters (wi) according to the scaling of the $2^{Si}$ form by channels may be matched with the minimum value, the maximum value range of the entire layer as much as possible, as shown at a lower portion of FIG. 1C and may have a range optimized for layer-wise quantization. The $2^{Si}$ scale may be applied to the bias (bi) in the same manner.

Thereafter, in the convolution layer in which the quantization module parameter scale is adjusted, the layer-wise linear quantization may be performed.

The electronic apparatus (NPU HW, 100) may include an ALU wallet module responsible for fixed computing, a cache memory for storing a parameter required for computation in each cycle and an input/output feature map, and a memory for sharing an overall parameter and a feature map.

The ALU module may be structurally changed to fixed computing ALU w/Ch-wise shift scaling according to the operation of the WES module of the compiler 200, and this will be described below with reference to the following drawings.

Figure 3:
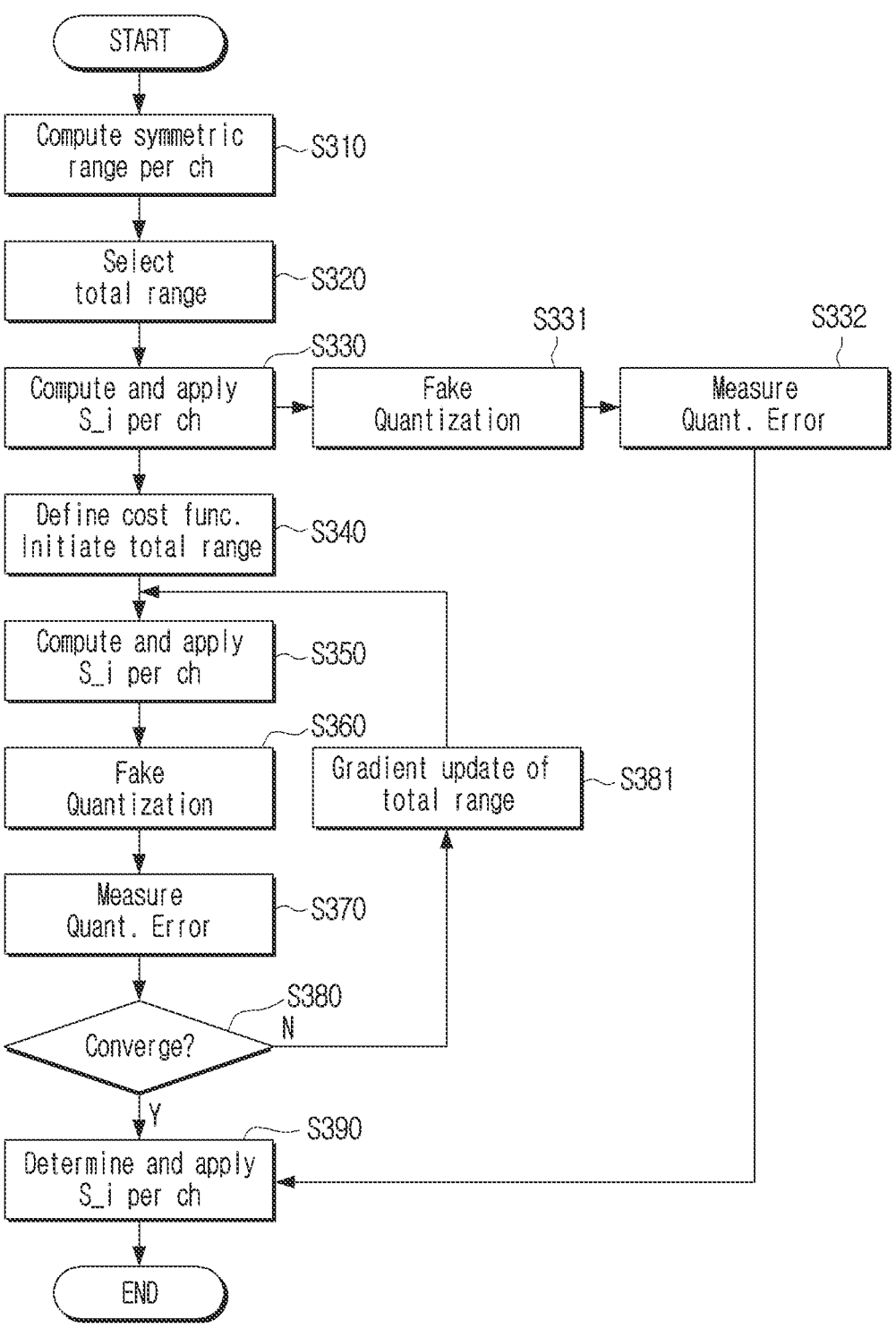
FIG. 3 is a flowchart illustrating a method of obtaining a shift scaling factor according to an embodiment of the disclosure.

FIG. 3 is a flowchart illustrating a method of obtaining a shift scaling factor according to an embodiment of the disclosure.

Referring to FIG. 3, the WES module may obtain a range of original parameters for each channel in operation S310. The WES module may select the total range in operation S320, obtain a channel-wise shift scaling factor based on the total range and the channel-wise range, and perform channel-wise shift scaling based on the obtained channel-wise shift scaling factor in operation 330.

The WES module may additionally perform layer-wise quantization in operation S331, calculate a quantization error in operation S332, re-obtain a channel-wise shift scaling factor based on the quantization error, and re-perform the channel-wise shift scaling based on the re-obtained channel-wise shift scaling factor in operation S390.

The WES module may additionally define a cost function for the total range after the channel-wise shift scaling in operation S340, perform channel-wise shift scaling based on the channel-wise shift scaling factor in operation S350, and calculate a quantization error in operation S370 after quantization in operation S360. The WES module may determine a channel-wise shift scaling factor when the quantization error converges to a predetermined value in operation S380, and perform a channel-wise scaling based on the determined channel-wise shift scaling factor in operation S390. Alternatively, when the quantization error does not converge to a predetermined value, the WES module may add up a ratio of the changed range value after scaling, and may readjust the channel-wise shift scaling factor by applying a gradient-decent method to increase the value.

By the above method, the WES module may obtain the channel-wise shift scaling factor.

Figure 4A:
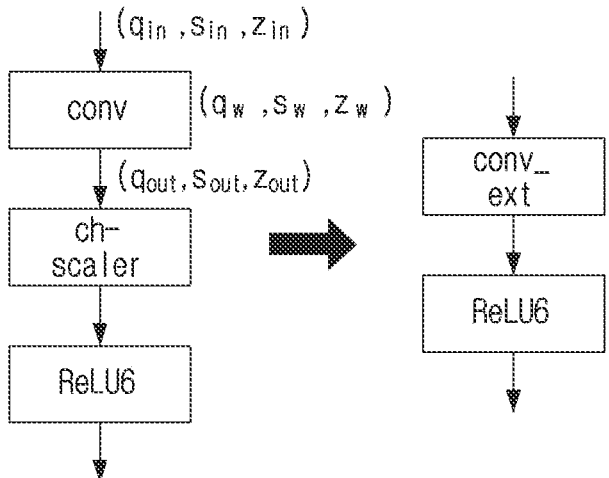
FIG. 4A is a diagram illustrating an inverse scaling operation according to an embodiment of the disclosure.
Figure 4B:
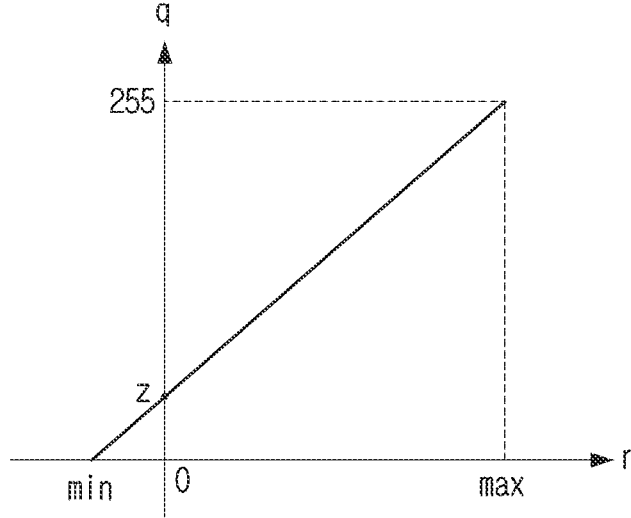
FIG. 4B is a diagram illustrating an inverse scaling operation according to an embodiment of the disclosure.

FIGS. 4A and 4B are diagrams illustrating an inverse scaling operation according to various embodiments of the disclosure.

Referring to FIG. 4A, a left convolution operation and scaler may be implemented as one configuration as the right. The left configuration will be described.

The fixed computing ALU for performing INT computation may load input data, weight values, scale parameters, and zero point parameters of the INTN quantized value from memory. Here, the scale parameter, the zero point parameter may include a scale parameter of the current layer, a scale parameter of the layer just before the current layer, and a scale parameter of the plurality of weight values.

The scale parameter may refer to a slope that represents the correlation of the data before and after quantization, and the zero point parameter may refer to the extent that the correlation is out of origin or the quantum value representing the real value 0.0.

Referring to FIG. 4B, the maximum value (max) of the real value axis may be quantized to 255, the minimum value (min) of the real value axis may be quantized to 0, and the slope is a scale parameter. The zero value of the real value axis may be quantized to z, where z is the zero point parameter.

The layer-wise scale parameter and the zero point parameter may be obtained in such manner.

The fixed computing ALU may obtain the output value from the parameter and the input value quantized in the fixed computing convolution layer as Equation 1. Here, $S_{in}$, $S_w$, $S_{out}$, each may represent the float scale value of int to float floating relative to a previous layer, a current layer, and the weight value, and may be different for each layer. The fixed computing ALU may convert $S_{in}*S_w/S_{out}$ to $M*2^{-s}$ (M: mantissa or multiplier, $2^{-s}$: exponent or shiftamount).

The fixed computing ALU may additionally load the integer Si represented as 4 bit among 2^Si of each channel from the memory. The channel-wise integer Si may be received from the compiler 200 and stored in the memory 110. The fixed computing ALU may add the shift scaling factor (s_i) corresponding to each channel as $M*2^{-s-s\_i}$ and thus, the composite scaling parameter in which $M*2^{-s}$ is inverse-scaled may be obtained, and as the right portion of FIG. 4A, the inverse scaling operation may be additionally performed during the convolution computation. The inverse scaling operation may be processed in a shift format in a direction opposite to each channel and thus hardware implementation is easy.

As described above, the compiler 200 may provide information on the channel-wise shift scaling factor to the electronic apparatus 100 as an integer Si represented by 4 bits in 2^Si. For example, in hardware supporting layer-wise quantization, the composite scale is including multiplier (M, 32 Bit) and a shift amount (S, 6 bit) common for channels, and according to the above method, the multiplier M and the shift amount S may be commonly used in the channel and the inverse scaling may be performed by receiving the Ch-wise shift scaling (Si) from the compiler as an additional parameter of a separate 4-bit format, scaling the value obtained by subtracting Ch-wise shift scale (Si) from the shift amount (S) to an output value, and multiplying by a multiplier. Alternatively, dual shift computation may be performed by shifting the output value by a shift amount, shifting again the output value by the Ch-wise shift scale and then multiplying by the multiplier.

The embodiment not limited thereto, and the compiler 200 may provide a channel-wise shift scaling factor to which the inverse scaling is applied. For example, the multiplier M may be commonly used for channels, and the compiler 200 may provide 6-bit information obtained by subtracting the Ch-wise shift scale (Si) by channels from the channel common S to the electronic apparatus 100.

While the compiler 200 and the electronic apparatus 100 may be separate devices, the two devices may be implemented as one integrated device.

Figure 5C:
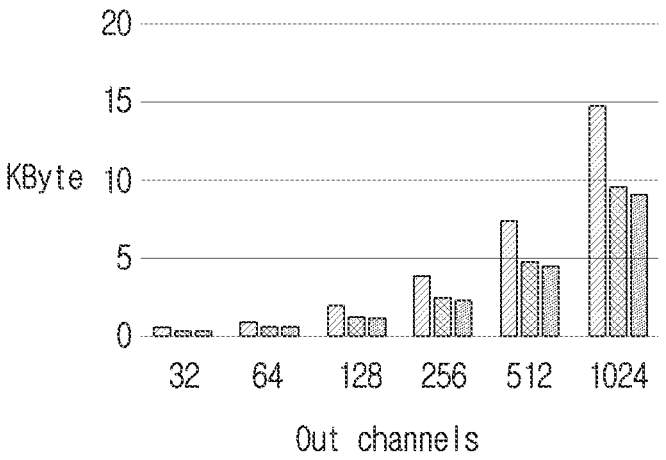
FIG. 5C is a diagram illustrating an effect according to an embodiment of the disclosure.

FIGS. 5A, 5B, and 5C are diagrams illustrating an effect according to various embodiments of the disclosure.

Referring to FIG. 5A, the accuracy of the case where the WES is used may be significantly closer to the accuracy of the baseline where quantization is not present, and may indicate higher accuracy than the related art.

Referring to FIG. 5B, the size of the parameter when the WES is used may be significantly smaller than that of quantization for each channel and may be slightly larger than that of quantization for each layer.

Referring to FIG. 5C, a result similar to that of FIG. 5B, which compares the size of the parameter according to the number of channels. For example, when the WES is used, there may be a slight increase in a parameter than if the WES is quantized for each layer, but the accuracy obtained thereby may be close to the example where there is no quantization.

Figure 6:
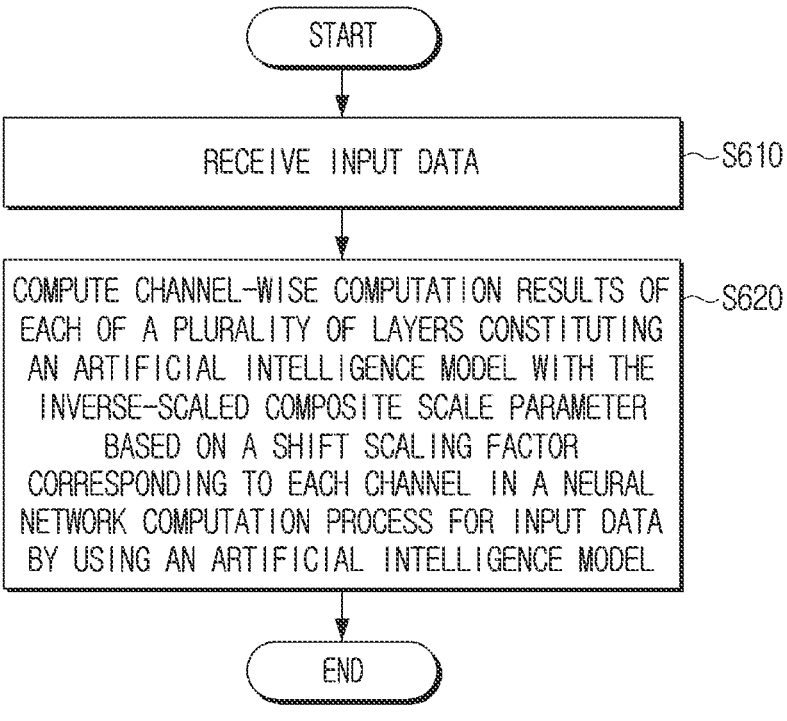
FIG. 6 is a flowchart illustrating a control method according to an embodiment of the disclosure.

FIG. 6 is a flowchart illustrating a control method according to an embodiment of the disclosure.

Referring to FIG. 6, first, the input data may be received in operation S610. In operation S620, channel-wise computation results of each of a plurality of layers constituting an artificial intelligence model may be computed with the inverse-scaled composite scale parameter based on a shift scaling factor corresponding to each channel in a neural network computation process for input data by using an artificial intelligence model. Here, the artificial intelligence model may include a plurality of weight values that are scaled based on different shift scaling factors for each of a plurality of channels included in each of the plurality of layers and quantized for each of the plurality of layers.

The AI model may include a plurality of quantized weight values, a plurality of channel-wise scaling factors included in each of the plurality of layers, scale parameters corresponding to each of the plurality of layers and a zero point parameter. The scale parameter may, based on each of the plurality of layers being quantized, represent a slope between a value before quantization and a value after quantization, the zero point parameter may, based on quantizing each of the plurality of layers, represent a value after quantization of a zero value before quantization.

The computing in operation S620 may include obtaining the composite scale parameter by inverse scaling of a value obtained based on a scale parameter of a current layer, a scale parameter of a layer just before the current layer, and a scale parameter of the plurality of weight values based on the shift scaling factors corresponding to a respective channel.

The computing in operation S620 may include obtaining the composite scale parameter by shifting the obtained value based on the shift scaling factors corresponding to the respective channel.

The obtained value may be inversely proportional to the scale parameter of the current layer, and may be proportional to the scale parameter of the layer just before the current layer and the scale parameter of the plurality of weight values.

The computing in operation S620 may include, based on identifying that the plurality of channel-wise shift scaling factors are included in the AI model, performing the computing.

The electronic apparatus may be implemented as a neural processing unit (NPU).

The shift scaling factors corresponding to the respective channel may be determined based on a weight value included in the respective channel and a weight value included in a layer including the respective channel.

The shift scaling factor corresponding to the respective channel may be determined based on a weight value having greatest size in the respective channel and a weight value having greatest size in a layer including the respective channel.

According to various embodiments as described above, the electronic apparatus may improve the accuracy of a neural network computation while using an artificial intelligence model implemented in a relatively small capacity by computing the channel-wise computation result with inverse-scaled composite scale parameter based on the shift scaling factors corresponding to each channel.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, electronic apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium, such as memory of a relay server.

The above-described various embodiments may be implemented in a computer- or similar device-readable recording medium using software, hardware, or a combination thereof. In some embodiments of the disclosure, the embodiments described herein may be implemented by the processor itself. Through the software implementation, the embodiments, such as a procedure and function described herein may be implemented with separate software modules. The software modules may perform one or more functions and operations described herein.

Computer instructions for performing the processing operations of a device according to various embodiments described above may be stored in a non-transitory computer-readable medium. The computer instructions stored in the non-transitory computer-readable medium, when executed by a processor of a particular device, may cause a particular device to perform processing operation in the device according to the various embodiments described above. A non-transitory computer-readable medium refers to a medium that stores data semi-permanently, rather than a medium that stores data for a short time, such as a register, cache, memory, or the like, and is capable of being read by a device. A specific example of a non-transitory computer-readable medium may be a compact disc (CD), a digital versatile disc (DVD), a hard disk, a Blu-ray disc, a universal serial bus (USB), a memory card, a read only memory (ROM), and the like.

According to various embodiments of the disclosure, the respective elements (e.g., module or program) of the elements mentioned above may include a single entity or a plurality of entities. According to the embodiments of the disclosure, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a memory configured to store an artificial intelligence (AI) model including a plurality of layers;
   a processor; and
   a shifter implemented in hardware and external to the processor, the shifter configured to perform channel-wise shift scaling improving accuracy of neural network computation in a portable device,
   wherein the AI model comprises a plurality of weight values that are scaled based on shift scaling factors different by a plurality of channels included in each of the plurality of layers and quantized by the plurality of layers, the quantization of the AI model reducing a data size of the model and enabling implementation of the model using limited resources,
   wherein the processor is configured to, based on receiving input data, in a process of a neural network computation for the input data, compute a channel-wise computation result with an inverse-scaled composite scale parameter based on a shift scaling factor corresponding to each channel,
   wherein the shifter is configured to receive a scale parameter and a channel-wise shift scaling factor from the memory and perform inverse scaling of an obtained value based on a scale parameter of a previous layer, a scale parameter of a current layer, and a scale parameter of a weight value to obtain a composite scale parameter based on the shift scaling factor corresponding to each channel,
   wherein the shifter is further configured to provide the composite scale parameter to the processor, and
   wherein the shift scaling factors corresponding to the respective channel are determined based on an exponential logarithmic ratio between the weight values in a layer including the respective channel.

2. The electronic apparatus of claim 1,
   wherein the AI model comprises a plurality of quantized weight values, a plurality of channel-wise shift scaling factors included in each of the plurality of layers, scale parameters corresponding to each of the plurality of layers and a zero point parameter corresponding to each of the plurality of layers,
   wherein a scale parameter of the scale parameters, based on each of the plurality of layers being quantized, represents a slope between a value before quantization and a value after quantization, and
   wherein the zero point parameter, based on quantizing each of the plurality of layers, represents a value after quantization of a zero value before quantization.

3. The electronic apparatus of claim 2, wherein the processor is further configured to, based on identifying that the plurality of channel-wise shift scaling factors are included in the AI model, perform the inverse scaling.

4. The electronic apparatus of claim 1, wherein the processor is further configured to obtain the composite scale parameter by shifting the obtained value based on the shift scaling factors corresponding to the respective channel.

5. The electronic apparatus of claim 1, wherein the obtained value is inversely proportional to the scale parameter of the current layer, and is proportional to the scale parameter of the layer just before the current layer and the scale parameter of the plurality of weight values.

6. The electronic apparatus of claim 1, wherein the electronic apparatus is implemented as a neural processing unit (NPU).

7. The electronic apparatus of claim 1, wherein the shift scaling factors corresponding to the respective channel are determined based on a weight value included in the respective channel and a weight value included in a layer including the respective channel.

8. The electronic apparatus of claim 7, wherein the shift scaling factor corresponding to the respective channel is determined based on a weight value having greatest size in the respective channel and a weight value having greatest size in a layer including the respective channel.

9. A control method performed by an electronic apparatus, the method comprising:
   receiving, using the electronic apparatus, input data; and
   by using an artificial intelligence (AI) model implemented on the electronic apparatus, in a neural network computation process relative to the input data, computing a channel-wise computation result of each of a plurality of layers forming the AI model with an inverse-scaled composite scale parameter based on a shift scaling factor corresponding to each channel,
   wherein the AI model comprises a plurality of weight values that are scaled based on shift scaling factors different by a plurality of channels included in each of the plurality of layers and quantized by the plurality of layers, the quantization of the AI model reducing a data size of the model and enabling implementation of the model using limited resources,
   wherein a shifter is implemented in hardware in the electronic apparatus and external to a processor of the electronic apparatus, the shifter configured to perform channel-wise shift scaling improving accuracy of neural network computation in a portable device,
   wherein the shifter is configured to receive a scale parameter and a channel-wise shift scaling factor from memory of the electronic apparatus and perform inverse scaling of an obtained value based on a scale parameter of a previous layer, a scale parameter of a current layer, and a scale parameter of a weight value to obtain a composite scale parameter based on the shift scaling factor corresponding to each channel,
   wherein the shifter is further configured to provide the composite scale parameter to the processor, and
   wherein the shift scaling factors corresponding to the respective channel are determined based on an exponential logarithmic ratio between the weight values in a layer including the respective channel.

10. The method of claim 9,
   wherein the AI model comprises a plurality of quantized weight values, a plurality of channel-wise shift scaling factors included in each of the plurality of layers, scale parameters corresponding to each of the plurality of layers and a zero point parameter corresponding to each of the plurality of layers,
   wherein the scale parameter, based on each of the plurality of layers being quantized, represents a slope between a value before quantization and a value after quantization, and wherein the zero point parameter, based on quantizing each of the plurality of layers, represents a value after quantization of a zero value before quantization.

11. The method of claim 10, wherein the computing comprises obtaining the composite scale parameter by shifting the obtained value based on the shift scaling factors corresponding to the respective channel.

12. The method of claim 10, wherein the obtained value is inversely proportional to the scale parameter of the current layer, and is proportional to the scale parameter of the layer just before the current layer and the scale parameter of the plurality of weight values.

13. The method of claim 10, wherein the computing comprises, based on identifying that the plurality of channel-wise shift scaling factors are included in the AI model, performing the computing.

14. The method of claim 9, wherein the electronic apparatus is implemented as a neural processing unit (NPU).

15. The method of claim 9, wherein the shift scaling factors corresponding to the respective channel are determined based on a weight value included in the respective channel and a weight value included in a layer including the respective channel.

16. The method of claim 15, wherein the shift scaling factor corresponding to the respective channel is determined based on a weight value having greatest size in the respective channel and a weight value having greatest size in a layer including the respective channel.

17. At least one non-transitory computer-readable recording medium which can store a program for performing operations of:

receiving, using an electronic apparatus, input data; and by using an artificial intelligence (AI) model implemented on the electronic apparatus, in a neural network computation process relative to the input data, computing a channel-wise computation result of each of a plurality of layers forming the AI model with an inverse-scaled composite scale parameter based on a shift scaling factor corresponding to each channel, wherein the AI model comprises a plurality of weight values that are scaled based on shift scaling factors different by a plurality of channels included in each of the plurality of layers and quantized by the plurality of layers, the quantization of the AI model reducing a data size of the model and enabling implementation of the model using limited resources, wherein at least a portion of the program is executed on a shifter is implemented in hardware in the electronic apparatus and external to a processor of the electronic apparatus, the shifter configured to perform channel-wise shift scaling improving accuracy of neural network computation in a portable device, wherein the shifter is configured to receive a scale parameter and a channel-wise shift scaling factor from memory of the electronic apparatus and perform inverse scaling of an obtained value based on a scale parameter of a previous layer, a scale parameter of a current layer, and a scale parameter of a weight value to obtain a composite scale parameter based on the shift scaling factor corresponding to each channel, wherein the shifter is further configured to provide the composite scale parameter to the processor, and wherein the shift scaling factors corresponding to the respective channel are determined based on an exponential logarithmic ratio between the weight values in a layer including the respective channel.

18. The at least one non-transitory computer-readable recording medium of claim 17, wherein the program is configured to perform the operations of:

obtaining a range of original parameters for each channel; and defining a cost function for the range after the channel-wise shift scaling.

* * * * *